US008776014B2

(12) United States Patent
Arnott et al.

(10) Patent No.: US 8,776,014 B2
(45) Date of Patent: *Jul. 8, 2014

(54) SOFTWARE BUILD ANALYSIS

(75) Inventors: Andrew Layne Arnott, Kirkland, WA (US); Kieran Paul Mockford, Issaquah, WA (US); Dan James Moseley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 466 days.

This patent is subject to a terminal disclaimer.

(21) Appl. No.: 12/889,207

(22) Filed: Sep. 23, 2010

(65) Prior Publication Data
US 2012/0079447 A1 Mar. 29, 2012

(51) Int. Cl.
*G06F 9/44* (2006.01)

(52) U.S. Cl.
USPC ........... 717/110; 717/111; 717/106; 717/107; 717/153; 717/155; 707/704

(58) Field of Classification Search
None
See application file for complete search history.

(56) References Cited

U.S. PATENT DOCUMENTS

| | | | | |
|---|---|---|---|---|
| 5,940,619 | A * | 8/1999 | Abadi et al. | 717/156 |
| 5,960,196 | A * | 9/1999 | Carrier et al. | 717/122 |
| 6,178,546 | B1 | 1/2001 | McIntyre | 717/115 |
| 6,263,358 | B1 * | 7/2001 | Lee et al. | 718/100 |
| 6,266,805 | B1 * | 7/2001 | Nwana et al. | 717/104 |
| 6,918,113 | B2 * | 7/2005 | Patel et al. | 717/178 |
| 7,010,546 | B1 * | 3/2006 | Kolawa et al. | 707/694 |
| 7,168,064 | B2 | 1/2007 | Ousterhout et al. | |
| 7,197,417 | B2 * | 3/2007 | Pramanick et al. | 702/119 |
| 7,209,851 | B2 * | 4/2007 | Singh et al. | 702/119 |
| 7,266,181 | B1 * | 9/2007 | Zirngibl et al. | 379/88.17 |
| 7,693,820 | B2 | 4/2010 | Larson et al. | |
| 7,694,291 | B2 | 4/2010 | Chen et al. | |
| 7,797,689 | B2 | 9/2010 | Mockford | |
| 7,856,604 | B2 * | 12/2010 | Hooper et al. | 715/841 |
| 8,225,302 | B2 * | 7/2012 | Waugh et al. | 717/170 |
| 8,245,192 | B1 * | 8/2012 | Chen et al. | 717/122 |
| 8,365,138 | B2 * | 1/2013 | Iborra et al. | 717/104 |
| 8,464,210 | B1 * | 6/2013 | Tarle et al. | 717/106 |
| 2002/0120921 | A1 * | 8/2002 | Coburn et al. | 717/140 |

(Continued)

OTHER PUBLICATIONS

Lungu, et al., "The Small Project Observatory: Visualizing Software Ecosystems", Retrieved at << http://www.inf.usi.ch/phd/lungu/research/publications/resources/lungu-est.pdf >>, Apr. 30, 2009, p. 1-23.

(Continued)

*Primary Examiner* — Chameli Das
(74) *Attorney, Agent, or Firm* — Kevin Sullivan; Erian Haslam; Micky Minhas

(57) ABSTRACT

A method or software program that provides an analysis of a build, which can provide a developer with views of the build processes, is disclosed. Data is collected from the build. The collected data can include information regarding file access patterns from determining which files are accessed for read and which files are accessed for write by one or more software build tools and project interdependencies. The collected data can also include certain project properties, build configurations, intermediate directories such as logs, and other metadata of the build. The collected data is injected into a relational database that can be queried. Reports can be generated from the information stored in the database by tools that depict built projects and interdependencies. For example, the tools can be used to generate visualizations such as graphs.

19 Claims, 4 Drawing Sheets

(56) References Cited

U.S. PATENT DOCUMENTS

| | | | |
|---|---|---|---|
| 2002/0199170 A1* | 12/2002 | Jameson | 717/120 |
| 2003/0145124 A1* | 7/2003 | Guyan et al. | 709/318 |
| 2005/0038767 A1* | 2/2005 | Verschell et al. | 707/1 |
| 2005/0183075 A1 | 8/2005 | Alexander, III et al. | |
| 2005/0188350 A1* | 8/2005 | Bent et al. | 717/106 |
| 2005/0216555 A1* | 9/2005 | English et al. | 709/204 |
| 2007/0050762 A1* | 3/2007 | Chen et al. | 717/169 |
| 2007/0136718 A1 | 6/2007 | Mockford | |
| 2007/0168974 A1* | 7/2007 | Mockford | 717/124 |
| 2007/0250473 A1* | 10/2007 | Larson et al. | 707/2 |
| 2008/0005729 A1* | 1/2008 | Harvey et al. | 717/155 |
| 2008/0154840 A1* | 6/2008 | Rathi et al. | 707/1 |
| 2008/0178298 A1* | 7/2008 | Arai et al. | 726/29 |
| 2008/0201705 A1 | 8/2008 | Wookey | |
| 2008/0301639 A1* | 12/2008 | Bell et al. | 717/120 |
| 2008/0320151 A1* | 12/2008 | McCanne et al. | 709/228 |
| 2009/0037365 A1 | 2/2009 | Sinclair et al. | |
| 2009/0106730 A1 | 4/2009 | Mockford | |
| 2009/0138593 A1* | 5/2009 | Kalavade | 709/224 |
| 2009/0164534 A1 | 6/2009 | Mercer | |
| 2010/0042974 A1 | 2/2010 | Gutz et al. | |
| 2010/0050156 A1 | 2/2010 | Bonanno et al. | |
| 2010/0115001 A1 | 5/2010 | Soules et al. | |
| 2010/0191690 A1 | 7/2010 | Bitonti et al. | |
| 2010/0192135 A1* | 7/2010 | Krishnaswamy et al. | 717/140 |
| 2010/0262948 A1* | 10/2010 | Melski et al. | 717/101 |
| 2010/0281461 A1 | 11/2010 | Tyler et al. | |
| 2012/0260240 A1 | 10/2012 | Arnott et al. | |

OTHER PUBLICATIONS

Chelf, Ben, "Software Build Analysis", Retrieved at << http://www.coverity.com/library/pdf/Coverity-Software-Build-Analysis.pdf >>, pp. 17, retrieved on Jun. 24, 2010.

Tappolet, Jonas, "Semantics-aware Software Project Repositories", Retrieved at << http://people.csail.mit.edu/pcm/ESWC08PHD/tappolet.pdf >>, pp. 5, Publication Date Mar. 3, 2009.

Elwasif, et al., "Bocca: A Development Environment for HPC Components", Retrieved at << http://www.mcs.anl.gov/uploads/cels/papers/P1430.pdf >>, Oct. 21-22, 2007, pp. 9.

Office Action for U.S. Appl. No. 13/083,186 mailed Mar. 12, 2013 (17 pgs.).

Final Office Action for U.S. Appl. No. 13/083,186 mailed Aug. 20, 2013 (14 pages).

Office Action for U.S. Appl. No. 13/083,186 mailed Dec. 3, 2013 (13 pages).

* cited by examiner

SOFTWARE BUILD ANALYSIS

BACKGROUND

A software build is either the process of converting source code files into one or more software artifacts that can be run on a computing device or the result of doing so. For example, aspects of a software build include compiling source code files into executable code and linking objects together to perform an intended function. An incremental build is a software build where a sub-set of source code files are processed, such as source code files that have had changes made to them since the last build. An incremental build can increase the speed of the build process. A software build process can be slow, and typically just a few of the inputs are changed. Consequently, just a few of the outputs can be updated during an incremental build.

Software developers typically employ a build utility to perform a software build including an incremental software build. A build utility is a software development tool including a set of one or more build tools that can be used to perform a software build. A build tool can be used to manage a specific process of building a computer program and can at times coordinate and control other programs. The build utility manages the set of build tools to compile and link the various files in a particular order.

As software projects evolve and grow, their build system grows with it, often to proportions so large it becomes impractical for developers to keep track of how the build works, causing maintenance issues, deployment problems and slow builds. Build utilities have used either rough approximations for addressing these concerns, which at best provide incomplete solutions, or are designed to address concerns of a specific software build and are not adaptable for general applicability.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to a method or software program that provides an analysis of a build, which can provide a developer with views of the build processes. In one example, the method provides both a comprehensive high level view and a detailed low level view of the build process including build interdependencies. Data collected from the build can include information regarding file access patterns from determining which files are accessed for read and which files are accessed for write by one or more software build tools and project interdependencies. The data collected can also include certain project properties, build configurations, intermediate directories, logs, and other metadata of the build. The collected data is injected into a database that can be queried, such an SQL database or other data store that can be queried. Reports can be generated from information stored in the database by tools that can depict built projects and interdependencies. For example, the tools can be used to generate visualizations such as graphs. In one example, the reports can detect built projects flaws, such as unexpressed interdependencies between build components, and the graphs can draw attention to these flaws.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various embodiments described herein may be combined with each other, unless specifically noted otherwise.

Figure 1:
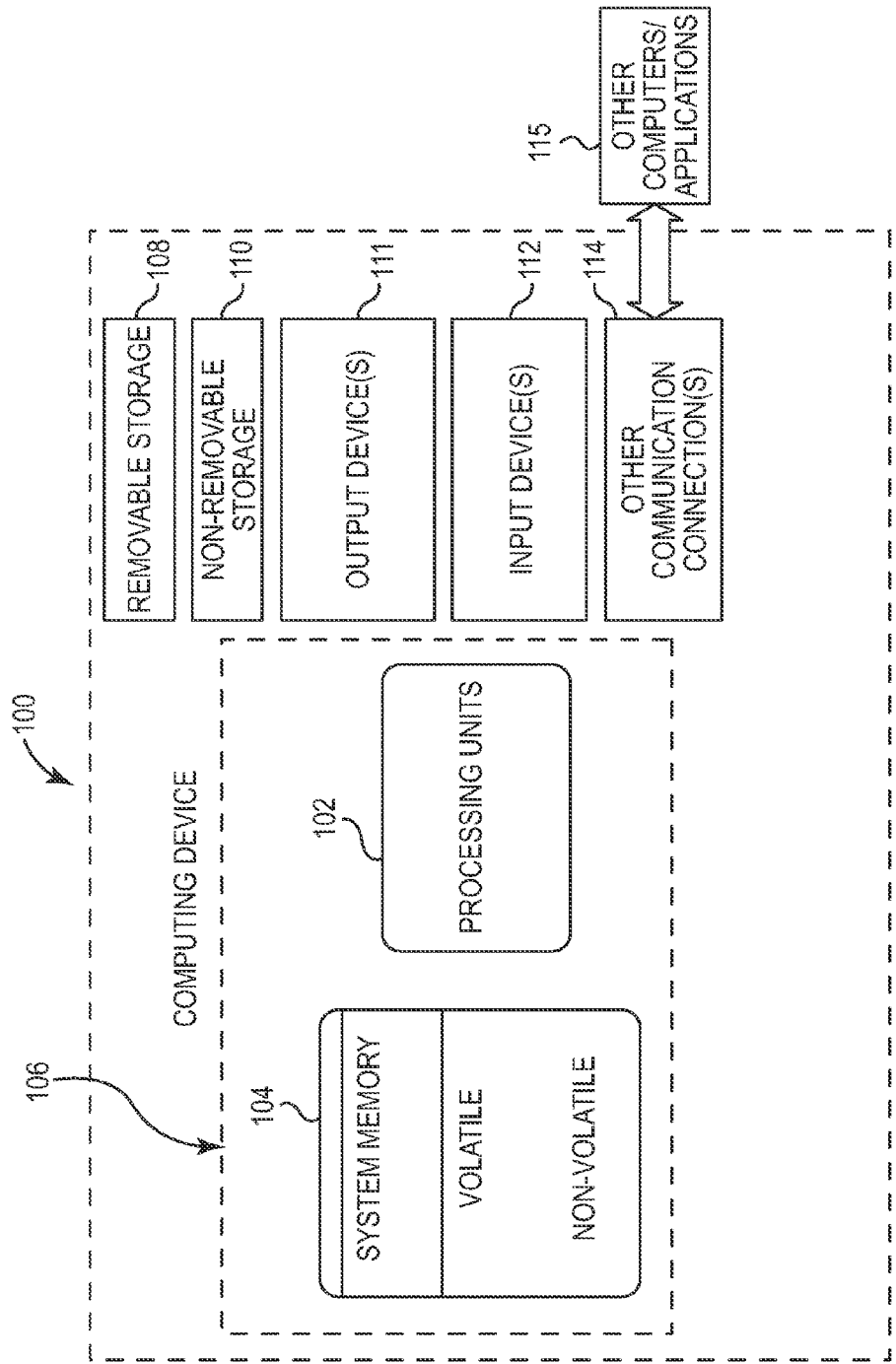
FIG. 1 is a block diagram illustrating an example computing device.

FIG. 1 illustrates an exemplary computer system. In one example, the computer system can perform a variety of processes and functions. For example, the computer system can be employed as an operating environment for a developer tool for performing a software build including a software build analysis of the present disclosure, and the computer system can be included as an example of a computing device for executing a software product resulting from the software build.

The exemplary computer system includes a computing device, such as computing device 100. In a basic configuration, computing device 100 typically includes a processor architecture having one or more processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment.

A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a unique thread identifier, and a thread context (or thread state) until the thread is scheduled. A thread context includes the thread's set of machine registers, the kernel stack, a thread environmental block, and a user stack in the in the address space of the process corresponding with the thread. In parallel applications, threads can be concurrently executed on the processor 102.

A multiple core processor can be implemented as the processor 102 in the computing device 100 to concurrently execute threads within the computing device 100. One example includes multiple cores implemented on a single die. Other examples are contemplated where the processor 102 exists on separate chips or other configurations. In some architectures, the processors can exist on separate machines such as in a computer cluster or other forms of distributed computing. Further, each physical core can capable of efficiently and concurrently executing multiple threads of a concurrent process. Such physical cores are often referred to as "Simultaneous Multi-Threading," or often simply "SMT," cores, and the concurrently executed threads on each physical core share hardware resources included within the single physical core. Each physical core capable of multithreading can present the operating system with as many logical cores as concurrently executing threads it supports. The systems and methods described below, however, are not limited to a particular architecture.

A build process can be partially divided into units that may be known as build projects or project files. Each build project indicates the input files and settings that will produce one or a relatively small number of intermediate or final output files. A build project may explicitly declare other projects it depends on, indicating that those other projects do work before the build project begins its own work.

As introduced above, software build systems evolve and grow with their corresponding software projects. Often, these build systems grow to proportions so large it becomes impractical for developers and existing build utilities to keep track of how the build works, causing maintenance issues, deployment problems and slow builds. For example, software builds can contain errors, such as timing errors, that are difficult to detect. Also, slow builds occur when unchanged files are built, which may be known as an overbuild. Conversely, files might not be built when they depend, possibly indirectly, on a file that has changed because the build process was not aware of the dependency, which may be known as an underbuild. Certain tools or systems, referred to here as build trackers or simply trackers, can collect raw data related to builds, but the data is vast and too often relates to issues that do not address a developer's particular concerns. Even if the data regarding the issue of interest can be isolated, it is often difficult to decipher. Furthermore, build trackers have difficulty detecting project-to-project relationships, particularly if dependent relationships are not expressed in the project file and could present a timing break if a scheduler cannot determine whether one project is to be built before another.

Figure 2:
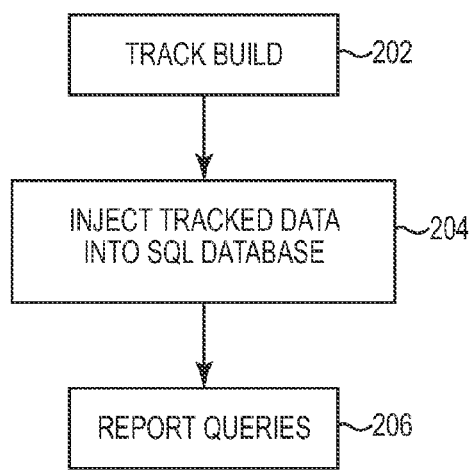
FIG. 2 is a block diagram illustrating an example method employed for build analysis with the computing device of FIG. 1.

FIG. 2 illustrates a method 200 that provides an analysis of a build, which can provide a developer with views of the build processes. In one example, the method 200 provides both a comprehensive high level view and a detailed low level view of the build process including build interdependencies. Method 200 collects data from the build at 202. For example, the method receives detailed information from actual builds of an entire tree of software products. The data collected includes information regarding file access patterns from determining which files are accessed for read and which files are accessed for write by one or more software build tools and projects. The data collected can also include certain project properties, build configurations, intermediate directories, logs, and other metadata of the build. The collected data is injected into a database that can be queried, such as a relational database, at 204, such as with a structured query language (SQL), or an SQL database. Reports can be generated from the information stored in the database by tools that can depict built projects and interdependencies at 206. For example, the tools can be used to generate graphs or charts. The reports can detect additional features of the built projects such as flaws, and the graphs can draw attention to these flaws.

Method 200 can be implemented as a tool to be run on the computing device 100, such as during the development of the application. In one example, the tool is a software program or part of a software package. The software program can be included in a computer readable storage medium storing computer executable instructions for controlling a computing device, such as computing device 100, to perform the method 200. In one example, the tool can be a part of an integrated development environment, or IDE. The IDE can include a code editor, a compiler, other build tools, a debugger and other tools for developing and testing an application. An example of an IDE is available under the trade designation "Visual Studio" from Microsoft, Inc. of Redmond, Wash. The software program can also be a separate product that can be used with one or more IDE packages or as a stand-alone product.

Figure 3:
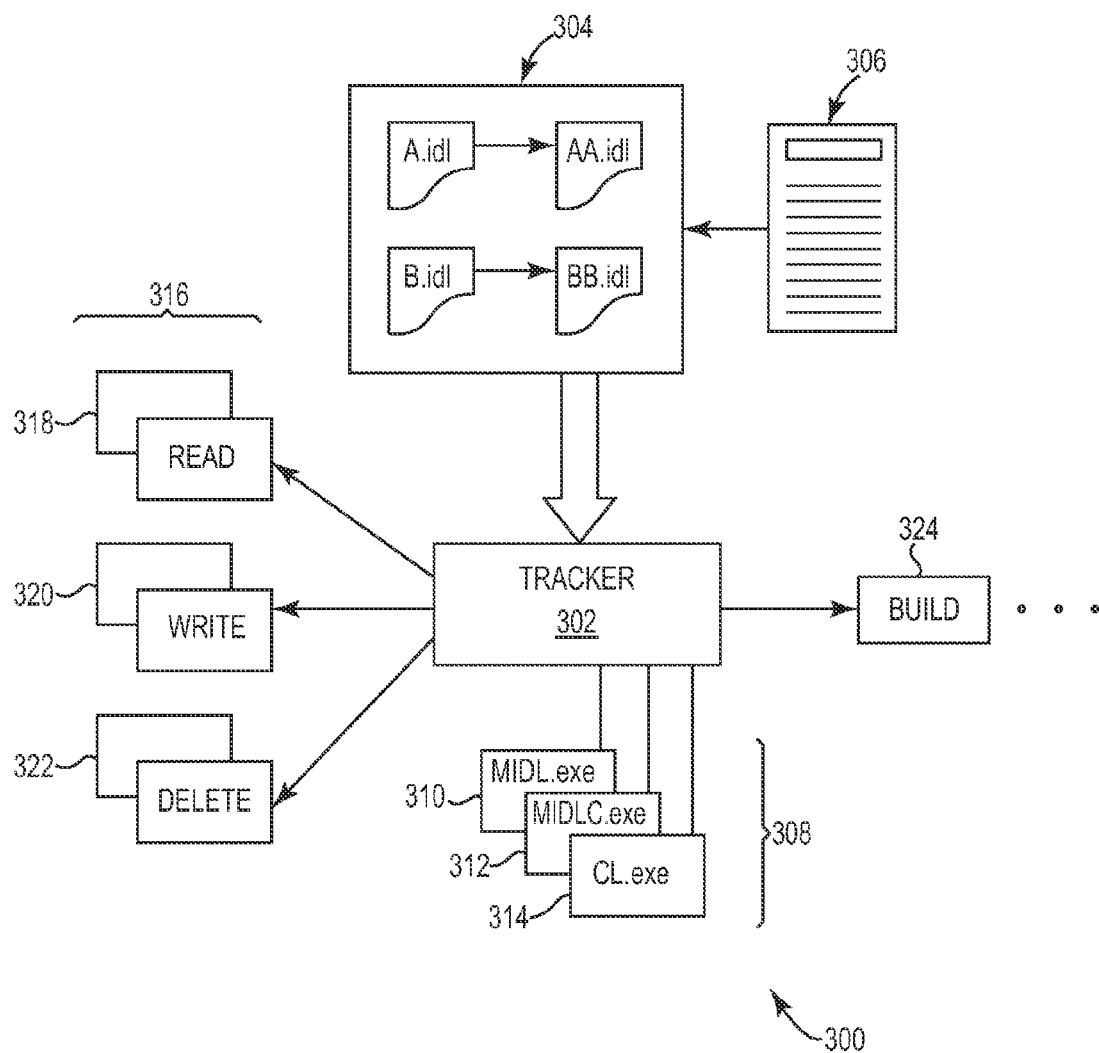
FIG. 3 is a schematic diagram illustrating an example tracking process employed in the method illustrated in FIG. 2.

FIG. 3 illustrates an example tracking and recording system 300 that can be employed in method 200 to collect data 202. The system 300 can be employed during an actual build and on an entire tree of software projects. The illustrated example includes one stage of the build, which can be repeated for additional stages. The system 300 includes a tracker 302 used to track files 304 and other information 306 accessed by one or more executable applications such as build tools 308 during a build. In one example, data collected can be used to drive an incremental build of the files to bring the build up to date. One of the build tools 308, such as tool 310 can invoke other build tools 312, 314, and every build tool 310, 312, and 314 is tracked with tracker 302. In one example, each thread in a multithreaded tool is tracked separately, which can preserve a pattern of access that could otherwise be lost.

In one example, the tracker 302, rather than the build process itself, invokes the build tools 308. The command to start a tool, such as MIDL.exe 310, which is normally given to an operating system, is redirected and given to tracker 302 instead. Similarly, whenever the build process requests to open the file 304, the request is handled by the tracker 302, which then redirects the request to the operating system. As such, one example of the tracker 302 collects data and can be employed to alter or augment the behavior of an operating system, of applications, or of other software components by intercepting function calls or messages or events passed between software components. The tracker 302 can employ a library for instrumenting functions. An example library can include a software product sold under the trade designation of Detours from Microsoft, which intercepts functions by rewriting target function images.

Data collected during tracking can be temporarily stored in memory 104 until it is injected into the database at 204. Information regarding the accessed files 304 collected with the tracker 302 can be stored in tracker logs 316, which are can be referred to as an arbitrary file extension such as ".tlog." In many cases, every file read is written to a read log 318 and every file write is written to a write log 320. Additional tracker logs 316, such as a delete log 322, are contemplated. In one example, logs 316, 318, and 320 can be included in a single log file, which can be structured to keep the data from each of the logs separate from the other data. In one example, information from each tool can be stored in a separate tracker log 316, and further subdivisions of tracker logs 316, such as by thread, are contemplated. In addition to tracker logs 316, a build log 324 can be attached during the build. A software build process may record all its activities and state during the build in a log, possibly using a component or tool that may be known as a build log 324. The build log 324 includes information such as certain project properties, the build configuration, intermediate directories (which may include .tlog files), and other information.

In addition to information on the accessed files 304, the tracker 302 can be configured to capture other data that influences builds. Such other data can include captured inputs, environmental variables, operating system, installed patches, and the like. In one example, the tools 306 invoked during a build can be considered as dependencies, and information regarding the tools 306 and their invocation can be captured and stored. In addition, information regarding shared files defining common build process steps, and other such shared files. Still further, additional information can include intermediate files. Intermediate files are generated directly or indirectly from the source files, but are not themselves the useful product of the build. This additional information can be useful when querying the database.

Data from the tracker log 316 and build log 324 are injected into a database that can be queried, such as an SQL database at 204 or other data store that can be queried. In one example the database is targeted for embedded and small-scale applications, for instance a database sold under the trade designation of Windows SQL Server Express from Microsoft, Inc. In one example of process 204, the data is injected asynchronously with the build. In another example, the injections can be made after much of the work of the build is finished, such as before or after the build exits, so as not to interfere with the build.

Figure 4:
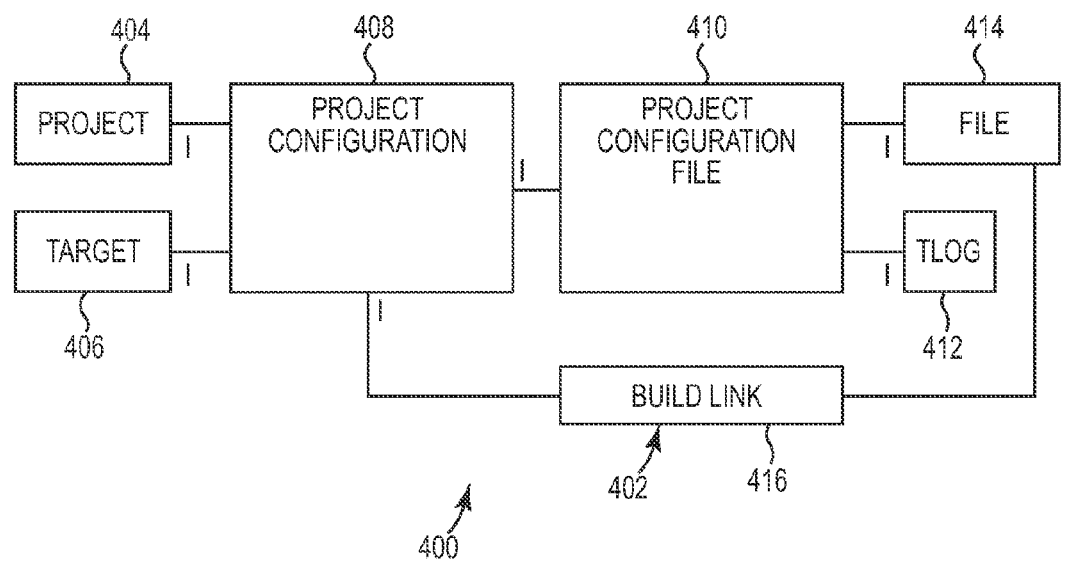
FIG. 4 is a schematic diagram illustrating an example database schema employed in the method illustrated in FIG. 2.

FIG. 4 illustrates a block diagram of a database schema 400 including several tables 402 that is an example for a relational database employed to receive the data from the tracker logs 316 and the build log 324. Project table 404 includes data regarding the features of the project files, such as file 304. A target table 406 includes data regarding any target that has been invoked from outside of the project. A build process can be composed of more than one named step, which may be known as a "target," and it can be invoked by name, or in an order otherwise inferred. Typically, a target produces specific output files given specific input files. If the input files and settings have not changed since the last translation, the target is considered to be "up to date," and its execution can be skipped. A project configuration table 408 includes data related to a specific configuration, such as Debug, of a specific project and is coupled to the project table 404 and the target table 406. The project configuration table 408 is coupled to a project configuration file table 410, which serves as a binding between a tracker log table 412 and a file table 414. The project configuration table 408 and the file table 414 are also coupled to a build link table 416, which includes data regarding a declared project reference between projects.

Examples of data in the project configuration table 408 can relate to build starts and stops, targets cleaned, up to date targets, dependencies, and dependents. In one example, a build of one configuration can be different than builds of another configuration. Also, configurations can be independently built and cleaned. Accordingly, separate configurations can each include a corresponding intermediate directory and a corresponding tracker log table 412, which can be the same, such as if isolation requirements of the information in the database are the same or similar.

The database schema 400 can also support incremental builds. For projects already including information in the database, the files in the tracker log 316 with an updated timestamp are read into the database, such as in the tracker log table 412. The content of these files replaces any existing content in the database associated with the corresponding files already in the tracker log table 412. External targets that are built can be added to the list of up-to-date targets for that project configuration. If an incremental build results in a tracker log files being deleted, the build can be considered as a "clean build." The targets can be cleared from a list of up-to-date targets in the project configuration table 408. For targets that are deleted, or cleaned, the corresponding files in the tracker log table 412 are included in the table 412 as the up-to-date target for that project configuration. A flag in the table 412 can be set to indicate the up-to-date-target is a cleaning target. A subsequent build of that project configuration results in that cleaning target as being removed from the up-to-date list and new targets will be included in the list.

The data collected in the database as part of a build can be employed for a wide range of queries. The queries can be presented in a report at 206, such as in a graph, chart, or other visualization. In one example, tools can be employed to present flaws in the build process and draw attention to the flaws in the visualization.

An example report can illustrate relationships between projects. The relationships can be determined from tracking all inputs and outputs in the build of each project. In one example, the relationships can be determined even if they are not represented by project references in the project file 304. Also, the build log 324 attached during the build receives notice of project-to-project jumps, and the report can identify cases where one project depends on another. This can be true even if that relationship is not expressed in the project file 304 and could present a timing break if a scheduler cannot determine whether one project is to be built before another.

Figure 5:
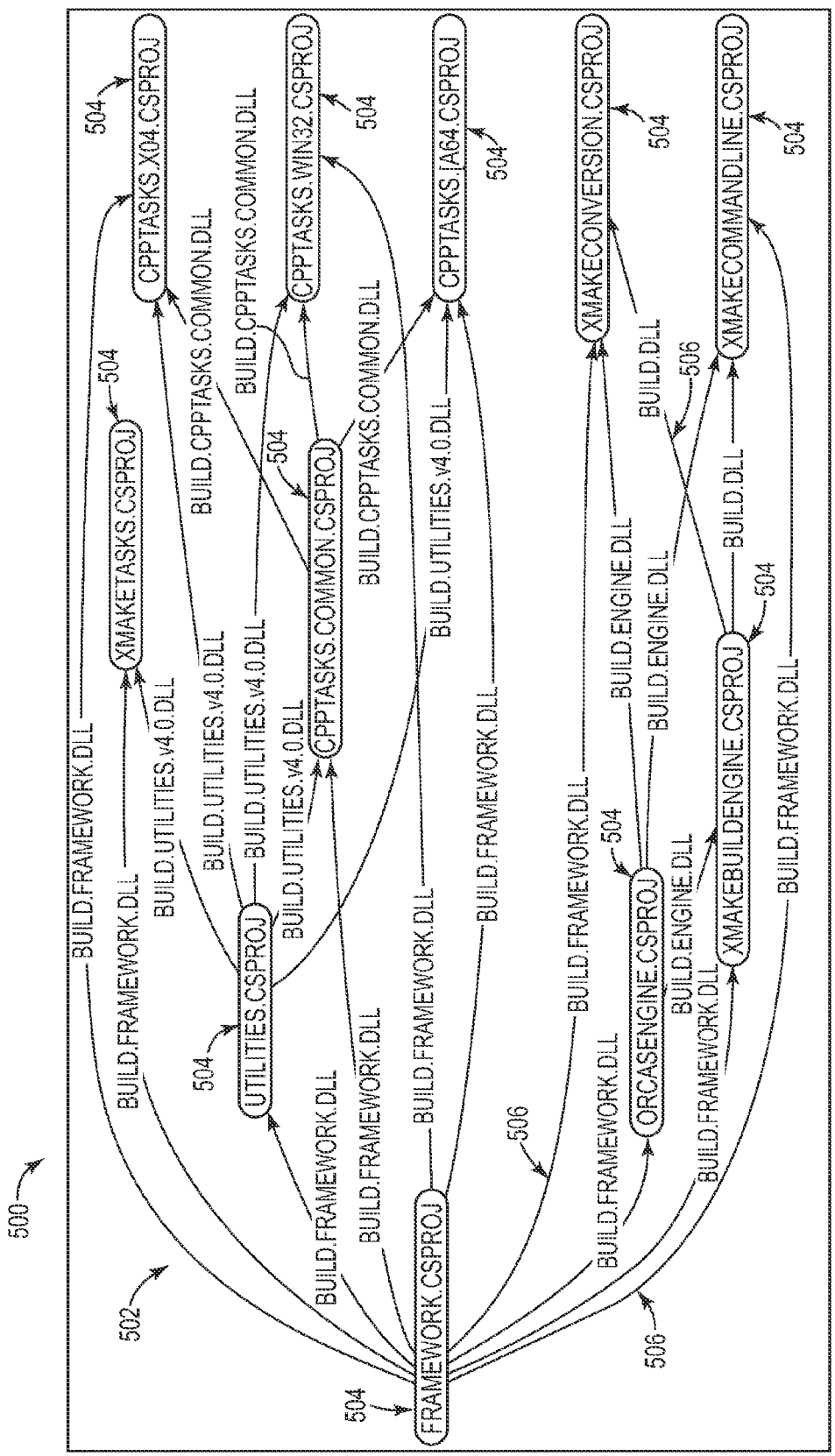
FIG. 5 is a schematic diagram illustrating an example reporting feature of the method illustrated in FIG. 2.

FIG. 5 illustrates an example report of one of those queries as graph 500. The graph 500 illustrates an example relationship between projects, and the graph can also be reported or output in a serialized format or language. One example of such a language is DGML, defined by Microsoft, Inc. Graph 500 depicts a build source tree 502 and can include a legend (not shown). The nodes 504 of the graph can represent projects, the links 506 can represent relationships, and the arrows 508 in the links 506 can be used to represent the direction of data flow. The nodes 504 can each include indicia regarding the status of the corresponding project. For example, nodes of a certain color can indicate whether the projects are up-to-date, out-of-date, intermediate, or another status. The links 506 can also be presented in a color to indicate such information as whether the relationship is covered by an appropriate project-to-project reference. Other visualizations of presenting this query and other queries are contemplated.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for use with a software build, the method comprising:
   collecting information into a memory regarding file access patterns of a plurality of build projects of a build process, the information being collected from determining which files are accessed for read and which files are accessed for write by one or more software build tools during the software build;
   injecting the collected information from the memory into a relational database that can be queried;
   detecting interdependencies of build projects of the plurality of build projects in the build process from a query of the relational database; and
   generating a report from the information in the relational database to depict the build projects and interdependencies wherein the report illustrates relationships between the build projects and is determined from tracking inputs and outputs during building of each of the build projects.

2. The method of claim 1 wherein collecting information includes tracking files accessed by one or more executable applications during a build.

3. The method of claim 2 wherein every build tool is tracked.

4. The method of claim 2 wherein each thread in a multi-threaded build tool is tracked separately during the collecting information.

5. The method of claim 2 wherein tracking preserves a pattern of access.

6. The method of claim 1 wherein the collected information includes at least one of project properties, build configurations, intermediate directories, and metadata of the build.

7. The method of claim 6 wherein the collected information includes information regarding the build tools and invocation of the build tools.

8. The method of claim 1 wherein the collected information is injected asynchronously with the build.

9. The method of claim 1 wherein the relational database supports incremental builds.

10. The method of claim 9 wherein collected information injected into the relational database includes an updated timestamp.

11. A computer readable storage medium storing computer executable instructions for controlling a computing device to perform a method for use with a software build, the method comprising:
    collecting information into a memory regarding file accesses and patterns of a plurality of build projects of a build process, the information being collected from determining which files are accessed for read and which files are accessed for write by one or more software build tools during a software build;
    injecting the collected information from the memory into a relational database that can be queried;
    detecting interdependencies of build projects of the plurality of build projects in the build process from a query of the relational database; and
    generating a report from the information in the relational database to depict the build projects and interdependencies wherein the report illustrates relationships between the build projects and is determined from tracking inputs and outputs during building of each of the build projects.

12. The computer readable storage medium of claim 11 wherein a tracker used for collecting information invokes the build tools.

13. The computer readable storage medium of claim 11 wherein information regarding the accessed files is stored in tracker logs.

14. The computer readable storage medium of claim 13 wherein information regarding project properties, build configurations, intermediate directories, and metadata of the build is stored in a build log.

15. The computer readable storage medium of claim 14 wherein the build log is attached during the build.

16. The computer readable storage medium of claim 14 wherein the build log receives notice of project-to-project jumps.

17. The computer readable storage medium of claim 11 wherein the relational database includes a schema having one or more of,
    a project table including data regarding the features of project files;
    a target table including data regarding a target invoked from outside of a project;
    a project configuration table including data related to a specific configuration of a selected project, wherein the project configuration table is coupled to the project table and the target table;
    a tracker log table and a file table;

a project configuration file table binding the tracker log table and the file table and the project configuration table; and a build link table including data regarding a declared project reference between projects, wherein the build link table is coupled to the project configuration table and the file table.

18. The computer readable storage medium of claim 11 wherein the report is presented as a visualization.

19. A computer readable storage medium storing a development tool including computer executable instructions for controlling a computing device for use with a software build, the development tool configured to perform a method comprising:

collecting information into a memory regarding file accesses and patterns of a plurality of build projects of a build process, the information collected from determining which files are accessed for read and which files are accessed for write by one or more software build tools and project interdependencies during a software build, wherein the collected information includes at least one of project properties, build configurations, intermediate directories, metadata of the build, and notice of one or more project-to-project relationships;

injecting the collected information from the memory into a relational database that can be queried, wherein the relational database supports incremental builds;

detecting interdependencies of build projects of the plurality of build projects in the build process from a query of the relational database;

generating a report based on the query of the relational database to depict built projects and interdependencies as a visualization; and generating a report from the information in the relational database to depict the build projects and interdependencies wherein the report illustrates relationships between the build projects and is determined from tracking inputs and outputs during building of each of the build projects.

* * * * *